Patented June 24, 1947

2,422,890

UNITED STATES PATENT OFFICE 2,422,890

PYRIMIDINE COMPOUNDS

Francis Henry Swinden Curd and Francis Leslie Rose, Blackley, Manchester, England, assignors to Imperial Chemical Industries Limited, a corporation of Great Britain No Drawing. Application January 10, 1945, Serial No. 572,247. In Great Britain February 4, 1944

7 Claims. (Cl. 260—251)

This invention relates to the manufacture of pyrimidine compounds which are useful as intermediates in the manufacture of chemotherapeutic agents and especially of the parasiticidal agents of our copending application Ser. No. 555,750, filed September 25, 1944.

We have found that 2-arylguanidino-4-hydroxypyrimidines wherein either or both of the 5- and 6-positions may be unoccupied or may be occupied by a hydrocarbon radical or alternatively the 5- and 6-positions jointly may be occupied by a single divalent aliphatic hydrocarbon radical which forms with the 5- and 6-carbon atoms an alicyclic ring, and wherein the aryl radical of the 2-arylguanidino group is unsubstituted or substituted by one or more simple non-acidic substituents such, for example, as hydrocarbon radicals (which themselves may optionally bear simple substituents and which may be attached to the aryl radical directly or through an oxygen or sulphur atom or through an imino, sulphonyl or carbonyl group), halogen atoms, or cyano, nitro, amino, acylamino, esterified carboxyl or esterified hydroxy groups, can be made by a process comprising the interaction of an appropriate arylamine with an appropriate 2-cyanimino-4-hydroxypyrimidine substituted, if necessary, in the manner indicated, in the 5- and/or 6-positions.

The reaction is conveniently brought about by heating together the 2-cyanimino-4-hydroxypyrimidine and the arylamine or a salt thereof, optionally in presence of a solvent or diluent. A convenient solvent is a mixture of β-ethoxyethanol and water.

Accordingly, using the same generic symbols as in our co-pending application above referred to, the process of this invention may be expressed by the general equation:

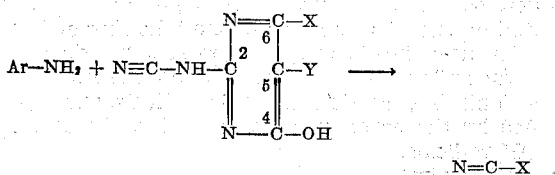

In the above formulas, Ar designates an aryl radical which may have various substituents as above indicated but is devoid of acidic substituents; the pair of symbols X and Y represent substituents selected from the following group, namely: (a) a single divalent aliphatic hydrocarbon radical which forms with the 5- and 6-carbon atoms an alicyclic ring, (b) two hydrocarbon radicals, (c) one hydrocarbon radical and one hydrogen atom, and (d) two hydrogen atoms.

The 2-cyanimino-4-hydroxypyrimidines used as starting materials are conveniently made by interaction of dicyandiamide with a formylacetic ester appropriately substituted if necessary on the α- and/or β-carbon atoms.

The following examples illustrate, but do not limit, the invention. The parts are by weight.

EXAMPLE 1

A mixture of 13 parts of aniline hydrochloride, 12.5 parts of 2-cyanamino-4-hydroxy-6-methylpyrimidine, 80 parts of β-ethoxyethanol and 14 parts of water, is heated under reflux for 20 hours. The resultant solution is cooled and made alkaline by addition of aqueous ammonia (sp. gr. 0.880). A precipitate is formed. 300 parts of water are added and the mixture is stirred and filtered. The filter-cake consists of nearly pure 2-phenylguanidino-4-hydroxy-6-methylpyrimidine. It can be recrystallised from nitrobenzene and then melts at 248–250° C.

EXAMPLE 2

12.9 parts of p-chloroaniline, 12.9 parts of 2-cyanamino-4-hydroxy-6-methylpyrimidine, 50 parts of 7% aqueous hydrochloric acid and 120 parts of β-ethoxyethanol, are heated under reflux for 20 hours. The reaction mixture is then cooled and worked up in the manner described in Example 1, whereby there is obtained 2-p-chlorophenylguanidino - 4 - hydroxy - 6 - methylpyrimidine of M. P. 268–270° C. (uncorr.).

EXAMPLE 3

13.8 parts of p-nitroaniline, 15 parts of 2-cyanamino-4-hydroxy-6-methylpyrimidine, 10 parts of concentrated hydrochloric acid and 90 parts of β-ethoxyethanol are heated together under reflux for 20 hours. The reaction mixture is then cooled and worked up in the manner described in Example 1 whereby there is obtained 2-p-nitrophenylguanidino-4-hydroxy-6-methylpyrimidine, M. P. 259°–261° C. (uncorr.).

Similarly, starting from other arylamines and working in the manner described in Example 3, there may be made the 2-arylguanidino-4-hydroxy-6-methylpyrimidines given in Table 1, which also indicates the structure and amount of the arylamine to be used.

Table 1

| Ex. No. | No. of parts | Starting material, Structure | Reaction product, Structure |
|---|---|---|---|
| 4 | 11.8 | p-cyanoaniline | 2-p-cyanophenylguanidino-4-hydroxy-6-methylpyrimidine, M. P. 270° C. |
| 5 | 13.9 | p-methylmercaptoaniline | 2-p-methylmercaptophenylguanidino-4-hydroxy-6-methylpyrimidine, M. P. 250°–252° C. |
| 6 | 12.75 | m-chloroaniline | 2-m-chlorophenylguanidino-4-hydroxy-6-methylpyrimidine, M. P. 239° C. |
| 7 | 16.9 | p-aminodiphenyl i. e. p-phenylaniline | 2-p-phenyl-phenylguanidino-4-hydroxy-6-methylpyrimidine, M. P. 230°–233° C. |
| 8 | 21.9 | p-iodoaniline | 2-p-iodophenylguanidino-4-hydroxy-6-methylpyrimidine, M. P. 278–280° C. |
| 9 | 16.2 | 3:5-dichloroaniline | 2-(3′:5′-dichlorophenylguanidino)-4-hydroxy-6-methylpyrimidine, M. P. 270°–272° C. |
| 10 | 12.1 | 3:4-dimethylaniline | 2-(3′:4′-dimethylphenylguanidino)-4-hydroxy-6-methylpyrimidine, M. P. 246°–249° C. |
| 11 | 14.3 | β-naphthylamine | 2-β-naphthylguanidino-4-hydroxy-6-methylpyrimidine, M. P. 230° C. |

Example 12

A mixture of 17.6 parts of 2-cyanimino-4-hydroxy-5:6-trimethylenepyrimidine, 12.8 parts of p-chloroaniline, 16.4 parts of p-chloroaniline hydrochloride, 80 parts of β-ethoxyethanol and 24 parts of water is heated under reflux for 3

Table 2

| Ex. No. | No. of parts | Starting material, structure | Reaction product, structure |
|---|---|---|---|
| 13 | 19.0 | 2-cyanimino-4-hydroxy-5:6:7:8-tetra hydroquinazoline, M. P. 278° C. | 2-p-Chlorophenyl-guanidino-4-hydroxy-5:6:7:8-tetrahydroquinazoline, M. P. 260° C. |
| 14 | 13.6 | 2-Cyanimino-4-hydroxypyrimidine, M. P. above 310° C. | 2-p-Chlorophenylguanidino-4-hydroxypyrimidine, M. P. 258–259° C. |
| 15 | 16.4 | 2-Cyanimino-4-hydroxy-5:6-dimethylpyrimidine | 2-p-Chlorophenylguanidino-4-hydroxy-5:6-dimethylpyrimidine, M. P. 266° C. |
| 16 | 21.0 | 2-Cyanimino-4-hydroxy-5-phenylpyrimidine | 2-p-Chlorophenylguanidino-4-hydroxy-5-phenylpyrimidine, M. P. 245–246° C. |
| 17 | 17.8 | 2-Cyanimino-4-hydroxy-5-ethyl-6-methyl-pyrimidine | 2-p-Chlorophenylguanidino-4-hydroxy-5-ethyl-6-methylpyrimidine, M. P. 261° C. | hours. The resultant solution is diluted with 400 parts of cold water, whereupon a precipitate is formed, which is filtered off and washed with water. The crude 2-p-chlorophenylguanidino-4-hydroxy-5:6-trimethylenepyrimidine so obtained is dissolved in 120 parts of hot methyl alcohol with the aid of an excess of concentrated hydrochloric acid and the solution of the hydrochloride so obtained is filtered to remove any insoluble impurities. The filtrate is then made alkaline with ammonia and diluted with water, and the base which is precipitated is filtered off and recrystallised from β-ethoxyethanol. It then forms colourless needles which melt at 257°–258° C.

The cyanimino-4-hydroxy-5:6-trimethylenepyrimidine used as starting material in this example is made by use of a known general reaction. Equimolecular quantities of ethyl cyclopentanone-α-carboxylate and dicyandiamide are heated together in methyl alcohol and the reaction product is isolated by acidifying the reaction mixture. The reaction may be expressed by the following equation:

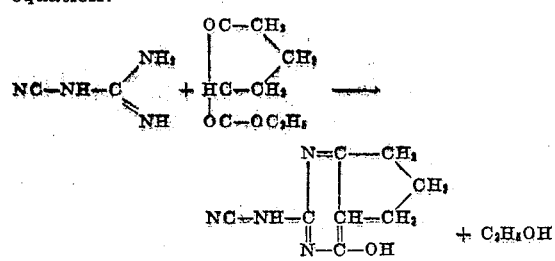

The cyanimino compound is very sparingly soluble in the common organic solvents, and when heated decomposes at 275° C. The same method is used for the preparation of the starting materials employed in the subsequent examples. In general, 2-cyanimino-4-hydroxypyrimidines melt or decompose at high temperatures and so cannot in every case be conveniently characterised by melting point.

Similarly, starting from other 2-cyanimino-4-hydroxypyrimidines, there may be made the 2-p-chlorophenylguanidino - 4 - hydroxypyrimidines given in Table 2 which also indicates the structure and amount of the cyanimino compound used.

The reaction in Example 13 above may be expressed by the following equation:

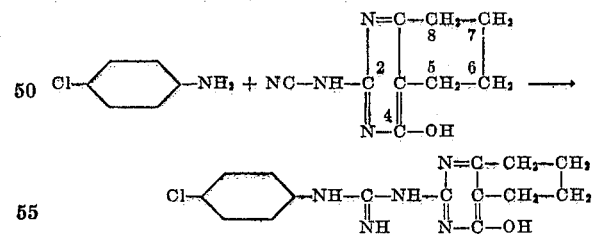

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

In the claims below, the expression "acidic substituents" refers to radicals commonly recognized as ionizable, salt-forming, acid radicals, and typified by the carboxy, sulfonic acid, and phenolic OH radicals.

We claim:

1. Process for the manufacture of 2-arylguanidino-4-hydroxypyrimidines free of acidic substituents in the aryl ring, which comprises reacting the corresponding arylamine with a 2-cyanimino-4-hydroxypyrimidine.

2. Process for the manufacture of 2-arylguanidino-4-hydroxy-6-methylpyrimidines devoid of acidic substituents which comprises the interaction of an arylamine devoid of acidic substituents with 2-cyanimino-4-hydroxy-6-methylpyrimidine.

3. Process for the manufacture of 2-arylguanidino-4-hydroxypyrimidines of the general formula

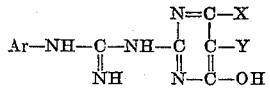

wherein the symbols Ar, X and Y have the meanings assigned to them hereinbelow, which comprises reacting an arylamine of the general formula Ar—NH$_2$ with a 2-cyanimino-4-hydroxypyrimide of the general formula

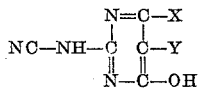

the symbol Ar in the above formulas being an aryl radical free of acidic substituents, while the pair of symbols X and Y represent substituents selected from the following group, namely: (a) a single divalent aliphatic hydrocarbon radical which forms with the 5- and 6-carbon atoms an alicyclic ring, (b) two hydrocarbon radicals, (c) one hydrocarbon radical and one hydrogen atom, and (d) two hydrogen atoms.

4. Process for the manufacture of 2-arylguanidino-4-hydroxypyrimidines devoid of acidic substituents, which comprises reacting an arylamine of the benzene series devoid of acidic substituents with a 2-cyanimino-4-hydroxypyrimidine of the formula

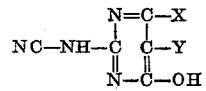

wherein X and Y represent substituents selected from the following group, namely: (a) a single divalent aliphatic hydrocarbon radical which forms with the 5- and 6-carbon atoms an alicyclic ring, (b) two hydrocarbon radicals, (c) one hydrocarbon radical and one hydrogen, and (d) two hydrogen atoms.

5. A process as in claim 4, wherein the reaction is carried out in the presence of an alcohol as a diluent.

6. A process as in claim 4, wherein the reaction is carried out in the presence of β-ethoxyethanol and water.

7. A process as in claim 4, wherein the arylamine employed is at least partly in the form of a salt thereof.

FRANCIS HENRY SWINDEN CURD.
FRANCIS LESLIE ROSE.